UNITED STATES PATENT OFFICE.

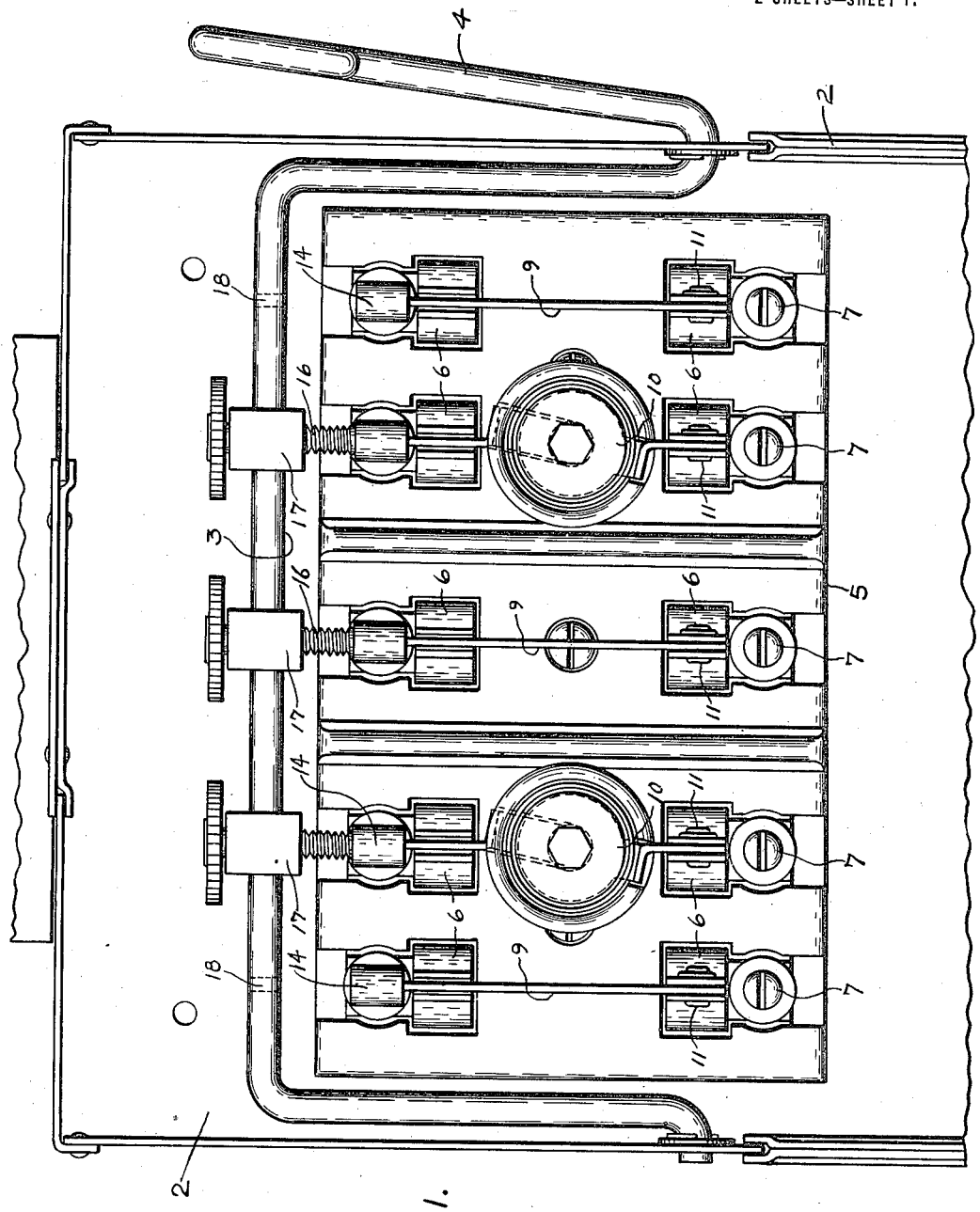

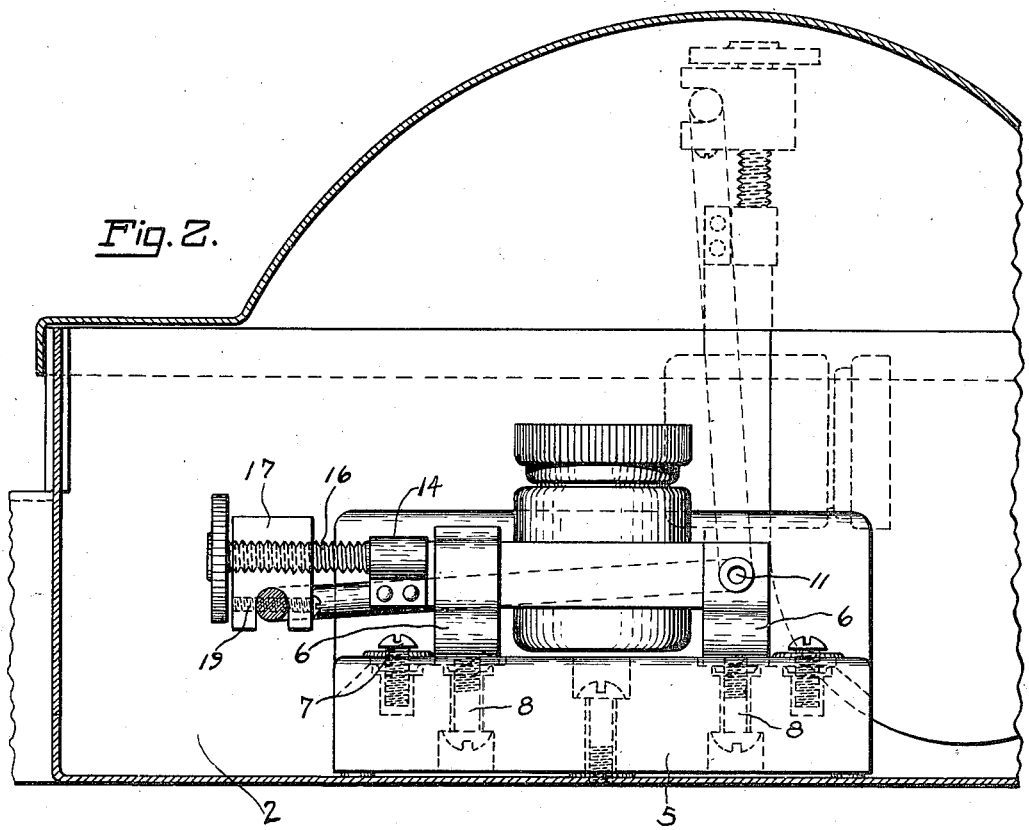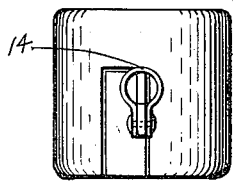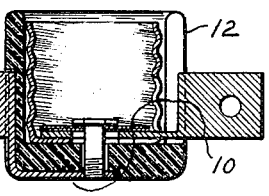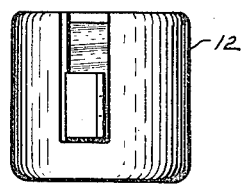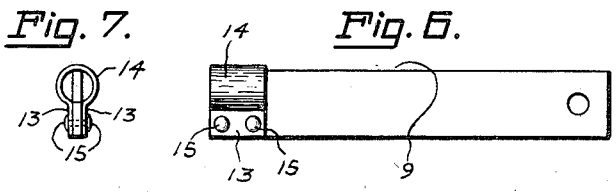

JOSEPH SACHS, OF HARTFORD, CONNECTICUT.

METER-TESTING APPLIANCE.

1,181,483.  Specification of Letters Patent.  Patented May 2, 1916.

Application filed April 28, 1915. Serial No. 24,452.

*To all whom it may concern:*

Be it known that I, JOSEPH SACHS, a citizen of the United States, residing at Hartford, in the county of Hartford and State of Connecticut, have invented certain new and useful Improvements in Meter-Testing Appliances, of which the following is a specification.

This invention relates to meter testing appliances, it being of such nature that it may be utilized either as a service and meter testing and connection device or as an electric meter testing switch, or if desired it may be used merely as a switch.

The present device possesses all the advantages of those set forth in my contemporaneously pending applications, Serial No. 877,113, filed December 14, 1914 for patent for service and meter testing and connection blocks, and in my application for patent for electric meter testing switch, filed March 12, 1915, Serial No. 13,895.

The present device comprises several features of novelty and advantage, among the principal being the provision of a connector of novel construction. This connector possesses the switching and meter testing qualifications of those set forth in the two prior applications to which I have alluded, but is of a construction to adapt it to coöperate with clip contacts. While this connector is of the character set forth, it has efficient means for connection therewith of testing means or switch-operating means.

As will be clearly obvious, I do not limit myself to the use of the device in any specific field, for it may be employed in conjunction with a so-called meter testing and connection block, and in connection with an electric meter testing switch or as a switch alone, and when so used the connectors may be either collectively or individually operated by being coupled one or more to suitable actuating means and when uncoupled may be individually or collectively operated in connection with testing instruments.

In the drawings accompanying and forming part of the present specification I have shown in detail several of the many different forms of embodiment of the invention which will be set forth fully in the following description. I do not restrict myself to this disclosure; I may depart therefrom in several respects within the scope of the invention defined by the claims following said description.

Referring to said drawings: Figure 1 is a face view of a meter testing appliance involving my invention showing the same incased with the cover of the casing removed and a part of the casing broken away. Fig. 2 is a sectional side elevation as seen from the left in Fig. 1, the section cutting through the box at one side of the block and through the transverse portion of the switch operating member, the parts being shown in their on and off positions by full and dotted lines respectively. Fig. 3 is a longitudinal section of one form of connector. Figs. 4 and 5 are end views of said connector as seen from the left and right of Fig. 3. Fig. 6 is a side elevation of a different form of connector. Figs. 7 and 8 are views corresponding with Figs. 4 and 5 respectively of the connector shown in Fig. 6.

Like characters refer to like parts throughout the several figures.

The invention as may be understood comprises as to one of its important features, a connector of novel character. This connector is of such nature as to adapt it to coöperate with contacts to make and break connection therebetween, at least one of the contacts being of clip form. As a matter of preference both contacts which coöperate with a connector are of this construction, so that when said connector is in circuit closing position, it fits between its coöperating clip contacts. This connector may be any one of several kinds; for example it may be plain or unfused or fused, and in turn when fused may be of any one of several different types, for instance it may carry a plug fuse, a link fuse, or an inclosed fuse. There are various constructions of connectors susceptible of coöperating with one clip of a pair or when both contacts of the pair are of clip kind, but one of several which has advantageously met my conditions is in the form of a blade either of continuous or unbroken or sectional form. When a connector is of sectional form, the sections thereof are separated from each other, being mechanically connected and adapted to be electrically connected by a fuse element. These connectors may be if desired, advantageously employed in the various ways set forth in my two prior applications already hereinbefore identified and also in any other desirable way.

In Fig. 1 I have shown one of a large number of appliances in which said connector or rather a series or a plurality of them can be efficiently incorporated. This appliance is such as that fully described in my application for patent for electric meter testing switch, Serial No. 13,895, filed March 12, 1915. In this particular organization the parts which should be protected are incased in a casing or housing as 2, and the switch operating element 3, the body of which is practically of bail-form, is supported for swinging movement by opposite sides of the casing or housing 2 and has an exterior handle 4 by which the switch operating element 3 is made exteriorly accessible, and if said switch operating element be connected or coupled with any one or more of said connectors they can be operated to perform their circuit controlling functions. As a part of the appliance shown in Figs. 1 and 2 is a base as 5 generally of insulating material such as porcelain and equipped with contacts as 6 arranged in pairs, these contacts as represented being of the two-lip clip form such as are ordinarily used in the well-known knife blade switches. As will be understood, however, I do not restrict myself to the use of a connector of knife blade construction but prefer to use a connector of such nature that its rupturing end is projectible into and from a clip contact on a base. Electrically connected with each of the contacts 6 is wire connecting means such as that denoted in a general way by 7. The contacts 6 may be held to the base 5 in any desirable manner, for example by the screws 8.

As a matter of simplicity I have shown only two kinds of connectors, one a solid or unfused connector as 9, and the other a fused carrying connector as 10. In the present instance these connectors are mounted for swinging movement, and I have described the fact that their rupturing ends are movable into and out of coöperating contacts 6. Their opposite ends as shown are pivotally mounted as at 11 between the lips of the supporting contacts or clips. In the appliance shown there are five of such connectors, two being fused and three unfused. The fused connector 10 as already noted is sectional, its sections being connected by the plug receiving or socket member 12 which receives within it a fuse plug as shown in my prior applications and by which the sections in question will be electrically connected when said fuse plug is positioned in the receiving socket 12.

As I have already noted, these connectors can be used in the manner fully set forth in my three prior applications. For instance they are adapted to coöperate with means to enable them to be used for either meter testing or for switching or in fact for radically different purposes. Each of the connectors whether of the plain or unfused type or whether fused in any of the ways discussed, is provided with means for association therewith of testing or switch operating means, and as a matter of simplicity said first mentioned means is adapted for interchangeable and removable correlation with the testing and switch operating means. It will be understood that there may be instances where an appliance is organized simply as a meter testing device in which case switch operating means need not be associated operatively with the connector or connectors thereof. On the other hand there may be instances where a connector or connectors is adapted solely for removable connection with switch operating means, and as will be inferred the testing means or switch operating means when employed in combination with a connector or connectors may vary decidedly.

As will be obvious the means on the connector of whatever character the latter may be, which is intended for the removable connection of testing or switch operating or other necessary means, may be of any suitable nature, there being provided, for example, a pin and socket connection between a connector and the means which for the time being coacts therewith. The connector is preferably equipped with the socket member, and when I speak of the part as a socket member, I do not mean to imply a device which has an uninterrupted or continuous wall, but rather a practically hollow or seating element which will receive within it, a complemental element. While the socket or seating element of a connector may be mounted thereon in any convenient place, I prefer that the same be situated approximately at the rupturing end, and I will describe a socket member which meets the desired conditions. This socket member in the present showing is the same with all the connectors, so that if in this respect I describe the connector 9 shown in detail in Figs. 6, 7 and 8, this will apply to the others. The rupturing end of the connector 9 is straddled by the depending cheeks, lips or flanges 13 of the split tubular part 14, the flanges extending outward from the split tubular portion or head 14 at opposite sides of the split therein and being secured in some convenient manner as by one or more rivets 15 to the coöperating connector 9. This split tubular portion 14 as will be obvious presents the operative or socket portion of a socket member, being adapted to receive in its forward open end a coöperating member which may be a device utilized in testing or a device utilized in switch operating. This split tubular head or portion 14 associated and electrically connected with and forming a part of the connector 9 is obviously made of conducting material, such as for instance a metal strip bent up to proper shape and provides a means whereby there may be correlatively associated with the connector one of several extraneous devices serving either for testing or switching purposes.

The appliance which I have illustrated in the drawings and in conjunction with which the connectors of the present invention are used, is a three-wire meter testing switch, incased and exteriorly operated so far as the switch functioning of the device is concerned. In this respect it is similar to the meter testing switch of my application 13,895 already referred to. I have not described in detail the switch operating member or element for the reason that this is substantially like that of the aforesaid application and is provided with suitable couplers or connecting means whereby it may be removably connected or disconnected with one or more of the several connectors. As a matter of fact the switch operating member or element 3 is provided with threaded coupling pins or plugs 16 like those shown in the last mentioned application, and these threaded coupling pins or plugs 16 are movable back and forth in insulating blocks or supports 17 secured to the switch operating member or element 3. The coupling ends of the threaded pins or studs 16 can therefore, be moved into and out of engagement with the appropriate socket members 14 forming a part of connectors. It will be noted that the transverse portion of the bail-like switch operating member has holes as 18 which are provided so that the insulating blocks 17 with their coupling pins or plugs 16 may be definitely positioned or placed in any desired position to coact with such of the connector members as it is desired to operate by the switch operating member. It will be understood that the blocks 17 with the coupling studs or pins 16 may be firmly held in position on the switch operating member in any desired manner, for instance by means of pins as 19 which may as shown be threaded and which pass through the proper holes or perforations 18. From what has been said, it will be clear that while I have shown three blocks 17 and their coupling studs 16 on the switch operating member 3, there may be any desired number.

The complete organization shown in Figs. 1 and 2 represents a three-wire meter testing switch appliance in a general way similar so far as its functioning for switching and meter testing purposes are concerned, as the meter testing switch shown in my prior application 13,895. The arrangement of the fused connectors with relation to the other connectors is that of Fig. 1 of the application just mentioned. So far as concerns, therefore, the functioning of the meter testing switch device here shown for switching and testing purposes, this is exactly similar to that of the device in the application in question.

It will be clear from the foregoing description taken in connection with the annexed drawings that the invention involves as to one of its important features an article of manufacture in the form of a connector of blade kind. When I speak of this connector as being of blade kind, I do not mean to imply in any sense that it is flat but rather of a nature that when in circuit closing position, it will be received within at least one of two coöperating contacts, this one contact being as I have already pointed out preferably in the form of a clip. It will, therefore, be clear that the cross sectional form of the connector may vary.

What I claim is:

1. A circuit controlling member of blade construction, shaped to be received in a contact clip, said circuit controlling member having means for the detachable connection therewith of means for testing or switching purposes.

2. A connector member of blade-like form, provided with means for the detachable association therewith of either testing or switch operating means.

3. A connector of blade-like form, provided with means for the detachable association therewith of either testing or switch operating means, said connector being adapted when associated with either of the aforesaid devices to be moved.

4. A connector shaped for coöperation with a receiving clip, said connector having means for the detachable association therewith of either testing or switch operating means, and when so associated being adapted to be moved thereby.

5. A circuit controlling blade adapted to serve as a connector member and provided with means for the detachable association therewith of either testing or switch operating means.

6. A connector of blade-like form provided with means for receiving testing means when in the open and closed positions thereof, through the medium of which said connector may be electrically connected with complemental connectors.

7. A base provided with coöperating contacts and a connector coöperative with the contacts and movable to open and close connection therebetween, one of the contacts being in the form of a clip and receiving in it the coöperating connector when the latter is in closing relation and said connector having means for the detachable connection therewith when in the open and closed positions thereof of an element adapted to coöperate with the connector.

8. A base provided with coöperating contacts, and a connector coöperative with the contacts and movable to open and close connection therebetween, one of the contacts being in the form of a clip and receiving in it the coöperating connector when the latter is in closing relation, and said connector having means for the detachable connection therewith of testing or switch operating means and being movable when the testing means is connected therewith to free its clip contact for testing purposes.

9. A base provided with coöperating contacts, and a connector coöperative with the contacts and movable to open and close connection therebetween, one of the contacts being in the form of a clip and receiving in it the coöperating connector when the latter is in closing relation and said connector having means for the detachable association therewith of testing or switch operating means and freeing said clip contact when in the open position thereof.

10. A plurality of connectors, a switch operating element, and means for coupling the switch operating element to any one or more of the connectors, the coupling means being adjustable on said switch operating element to permit the coupling of any of the connectors with the switch operating element.

11. A plurality of connectors one of which serves for meter-testing purposes, a switch operating element, and means adjustable on the switch operating element for connection at will with any one or more of the connectors in various relations one of said connectors having means for meter testing.

12. A plurality of connectors each provided with means for detachably receiving coupling means associated with a switch operating element, said coupling means being in sections and adapted to be positioned for association with such of the connectors as it may be desired to operate by the switch operating member.

13. A flat knife blade connector having means for the detachable association therewith of either testing or switch operating means.

14. A flat knife blade connector having a socket to removably receive in it a testing or switch operating device.

15. A flat knife blade connector having a pivotal end and a rupturing end and furnished at its rupturing end with a socket to removably receive within it either testing or switch operating means.

16. A flat knife blade connector provided with fuse carrying means and also provided with means for the removable association therewith of either testing or switch operating means.

In testimony whereof I affix my signature in presence of two witnesses.

JOSEPH SACHS.

Witnesses:
L. L. MARKEL,
HEATH SUTHERLAND.